United States Patent
Aoki

[11] Patent Number: 5,270,126
[45] Date of Patent: Dec. 14, 1993

[54] PHOSPHORIC ACID FUEL CELL, MATRIX THEREOF AND METHOD FOR MAKING THE MATRIX

[75] Inventor: Makoto Aoki, Kawasaki, Japan

[73] Assignee: Fuji Electric Co., Ltd., Kawasaki, Japan

[21] Appl. No.: 883,268

[22] Filed: May 14, 1992

[30] Foreign Application Priority Data

May 22, 1991 [JP] Japan ................... 3-116364

[51] Int. Cl.$^5$ ............................. H01M 8/08
[52] U.S. Cl. ........................ 429/12; 429/46
[58] Field of Search ...................... 429/12, 46

[56] References Cited

U.S. PATENT DOCUMENTS

| | | |
|---|---|---|
| 3,575,718 | 4/1971 | Adlhart et al. |
| 4,017,664 | 4/1977 | Breault. |
| 4,444,852 | 4/1984 | Liu et al. ............ 429/46 X |
| 4,623,415 | 11/1986 | Kahara et al. ........ 429/46 X |
| 4,661,423 | 4/1987 | Ueno et al. ............ 429/46 X |

FOREIGN PATENT DOCUMENTS 165264  9/1983  Japan.

OTHER PUBLICATIONS

Chemical Abstracts, vol. 97, No. 199067h, 1982.
Chemical Abstracts, vol. 100, No. 193052h, 1984.
Chemical Abstracts, vol. 106, No. 103298q, 1987.

*Primary Examiner*—Stephen Kalafut
*Attorney, Agent, or Firm*—Spencer, Frank & Schneider

[57] ABSTRACT

A matrix of a phosphoric acid fuel cell is composed of a boron nitride powder and a fluorine-contained resin. The boron nitride powder is bound with the resin to form a sheet.

7 Claims, 1 Drawing Sheet

PHOSPHORIC ACID FUEL CELL, MATRIX THEREOF AND METHOD FOR MAKING THE MATRIX

BACKGROUND OF THE INVENTION

1. Field of the Invention

The present invention relates to a fuel cell, and more particularly to a matrix of a phosphoric acid fuel cell and a method for making it.

2. Description of the Prior Art

As is generally known, a matrix of a phosphoric acid fuel cell is sandwiched between an air electrode to which an oxidizing agent gas such as air is supplied and a fuel electrode to which a reducing agent gas such as hydrogen gas is supplied. The matrix has a function of retaining phosphoric acid as an electrolyte, separating the oxidizing agent gas from the reducing agent gas so as not to mix and contact each other and intercepting the electric conduction by electrons between the electrodes. Hence, it is required that the matrix have sufficient corrosion resistance against phosphoric acid high electric insulation characteristics in addition to a high porosity for retaining phosphoric acid and excellent strength to resist the differential pressure.

Under these circumstances, silicon carbide has been generally used as a main material of the matrix in a conventional phosphoric acid fuel cell and a fine powder of silicon carbide has been bound with a binder such as a fluorine-containing resin, and then made into the formula sheet to construct the matrix.

In order to improve the output capacity of the phosphoric acid fuel cell, it is proposed to make the thickness of the matrix as thin as possible to reduce the resistance overvoltage. However, the physical property of silicon carbide such that is semiconductor-like, and the electric resistance of silicon carbide is low in comparison with that of an insulating material. Therefore, when the thickness of the matrix is made thin, electric conduction is caused in the fuel cell by the movement of electrons between the electrodes through the matrix. As a result, the output of the fuel cell reduced.

Silicon nitride is also used as a matrix material as disclosed, for example, in Japanese Laid-open Patent Application No. 165,264/1983.

Since silicon nitride is an insulating material, it does not have the problems discussed above for the case of silicon carbide. However, silicon nitride is expensive when compared with silicon carbide and is not yet practical for use in a fuel cell.

SUMMARY OF THE INVENTION

An object of the present invention is to provide a matrix of a phosphoric acid fuel cell having sufficient corrosion resistance to phosphoric acid and a high electric insulation property.

Another object of the present invention is to provide a method for making such a matrix.

A further object of the present invention is to provide a phosphoric acid fuel cell having excellent output characteristics.

In the first aspect of the present invention, a matrix of a phosphoric acid fuel cell comprises:

a sheet composed of a boron nitride powder bound with a fluorine-contained resin as a binder.

Here, the ratio of the powder may be within the range from 85 to 95 percent by weight and the ratio of the resin may be within the range from 5 to 15 percent by weight with respect to the total weight of the boron nitride powder and the resin.

The resin may be selected from the group consisting of polytetrafluoroethylene, tetrafluoroethylene/hexafluoropropylene copolymer, polyperfluoroalkoxyethylene, perpolyfluoroethylene propylene ether, tetrafluoroethylene/perfluoroalkylvinylether copolymer, trifluoroethylene and tetrafluoroethylene/ethylene copolymer.

In a second aspect of the present invention, a method for making a matrix of a phosphoric acid fuel cell comprises the steps of:

dispersing a boron nitride powder in a solvent to produce a first dispersion;

dispersing a fluorine-contained resin in another solvent to produce a second dispersion;

mixing the first dispersion with the second dispersion to produce a third dispersion;

separating a solid content from the third dispersion;

making the solid content into a form of sheet; and drying the sheet.

In a third aspect of the present invention, a method for making a matrix of a phosphoric acid fuel cell comprises the steps of:

dispersing a boron nitride powder in a solvent to produce a first dispersion;

dispersing a fluorinated-contained resin in a first dispersion to produce a second dispersion;

separating a solid content from the second dispersion;

making the solid content into a form of sheet; and drying the sheet.

In a fourth aspect of the present invention, a phosphoric acid fuel cell comprises:

a fuel electrode;

an air electrode; and a matrix for retaining phosphoric acid sandwiched between the electrodes, the matrix being composed of a boron nitride powder bound with a fluorine-contained resin as a binder.

Here, the ratio of the powder may be within the range from 85 to 95 percent by weight and the ratio of the resin may be within the range from 5 to 15 percent by weight with respect to the total weight of the boron nitride and the resin.

The resin may be selected from the group consisting of polytetrafluoroethylene, tetrafluoroethylene/hexafluoro propylene copolymer, polyperfluoroalkoxyethylene, perpolyfluoroethylene propylene ether, tetrafluoroethylene/perfluoroalkylvinylether copolymer, trifluoroethylene and tetrafluoroethylene/ethylene copolymer.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
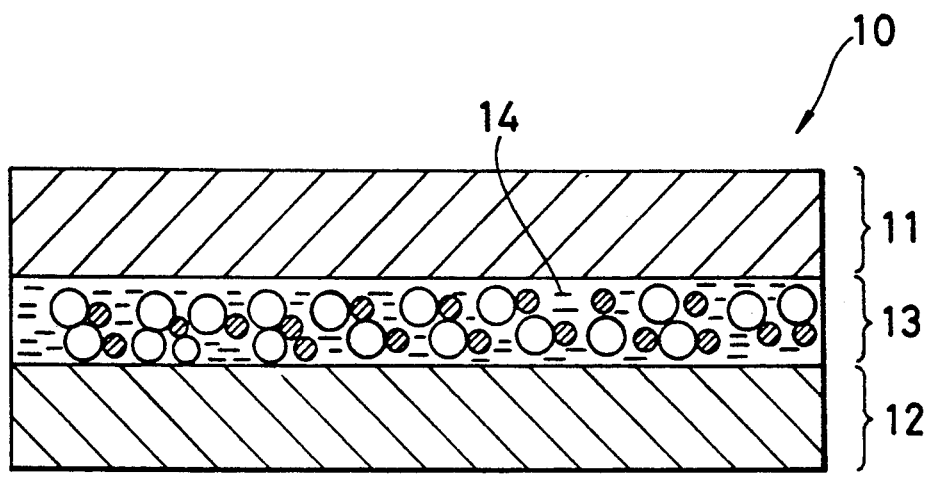
FIG. 1 is a schematic cross-sectional view showing an embodiment of the phosphoric acid fuel cell according to the present invention.

FIG. 1 is a schematic cross-sectional view showing a unit cell 10 of the phosphoric acid fuel cell according to the present invention. The unit fuel cell 10 is composed of an air electrode 11, a fuel electrode 12 and a matrix 13 sandwiched between the electrodes 11 and 12. Phosphoric acid 14 is retained in the matrix 13.

In general, the fuel cell is constructed by laminating the unit cell 10. In operation, a fuel, for instance hydrogen gas is supplied to the fuel electrode 12 and an oxidizing agent gas, e.g. air is supplied to the air electrode 11. Porous carbon sheets are used as electrode substrates for the fuel electrode 12 and the air electrode 11, respectively. Carbon particles on which a platinum catalyst is carried are coated on the surfaces of the electrode substrates. In the presence of phosphoric acid, the oxidation reaction of hydrogen gas and the reaction of protons with oxygen gas take place in the catalyst layers. The electric current flows through the laminated electrodes in series and an output power is taken from the fuel cell.

Figure 2:
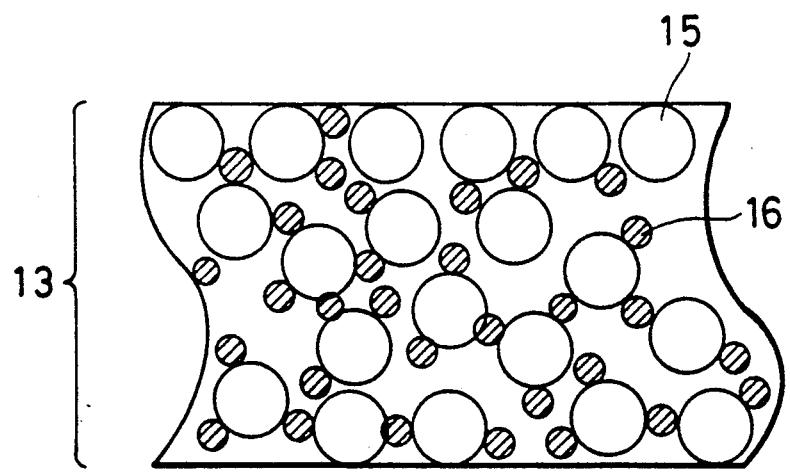
FIG. 2 is a schematic cross-sectional view showing an embodiment of the matrix used in the phosphoric acid fuel cell according to the present invention.

FIG. 2 is a schematic cross-sectional view of an embodiment of the matrix according to the present invention. The reference numeral 15 denotes a powder of boron nitride and the reference numeral 16 denotes a powder of a fluorine-contained resin as a binder for binding the boron nitride powder 15.

Boron nitride used as the matrix is a very chemically stable insulating material. Boron nitride also has high corrosion resistance against phosphoric acid at high temperatures and has high insulation characteristics at elevated temperatures. In addition, the electrical resistance of boron nitride is extraordinary high in comparison with that of silicon carbide, and besides, boron nitride can be easily crushed to a fine powder, and therefore, boron nitride is preferable as a matrix material of the phosphoric acid fuel cell.

It is preferable that the ratio of boron nitride in the matrix be within the range from 85 to 95 percent by weight with respect to the total weight of boron nitride and the fluorine-contained resin. It is also preferable that the ratio of the fluorine-contained resin in the matrix be within the range from 5 to 15 percent by weight with respect to the total weight of boron nitride and the fluorine-contained resin. When the fluorine-contained resin is less than 5 percent by weight, the matrix has a poor mechanical strength and it is difficult to form the matrix as a sheet. When the fluorine-contained resin is more than 15 percent by weight, the repellency of the matrix is too high.

The preferably used fluorine-contained resins which have excellent heat resistance and chemical resistance include polytetrafluoroethylene, tetrafluoroethylene/hexafluoropropylene copolymer, polyperfluoroalkoxyethylene, perpolyfluoroethylene propylene ether, tetrafluoroethylene/perfluoroalkylvinylether copolymer, trifluoroethylene and tetrafluoroethylene/ethylene copolymer.

EXAMPLE

A boron nitride powder of 10 g with an average diameter of about 3 $\mu$m was dispersed in isopropyl alcohol of 500 ml while applying ultrasonic vibrations. On the other hand, polytetrafluoroethylene of 1 g with an average diameter of about 0.3 $\mu$m was dispersed in isopropyl alcohol. This dispersion can be replaced by the commercially used polytetrafluoroethylene dispersion (manufactured by Mitsui Dupont Fluoro Chemical Co., 30-J). In this case, the content of polytetrafluoroethylene in this dispersion is adjusted to become 1 g. The dispersion containing boron nitride was admixed with the dispersion containing polytetrafluoroethylene to obtain a dispersion, in which the ratio of boron nitride was within the range from 85 to 95 percent by weight and the ratio of polytetrafluoroethylene was within the range from 5 to 15 percent by weight with respect to the total weight of boron nitride and polytetrafluoroethylene. This resultant dispersion was subjected to centrifugation for separating a solid content and the solid content obtained was kneaded. In addition, the kneaded solid content was rolled into a form of sheet by means of a rolling mill and the sheet was washed with water. A matrix with a thickness of 50 $\mu$m was produced by heating and drying the washed sheet at a temperature of above 100° C.

The phosphoric acid fuel cell comprising this matrix has an output voltage of 0.7 V under the conditions where the fuel cell was operated at 190° C. with a current density of 300 mA/cm$^2$. This fuel cell showed excellent output characteristics in comparison with a conventional phosphoric acid fuel cell.

In this example, polytetrafluoroethylene was dispersed in isopropyl alcohol and mixed with boron nitride dispersion. However, it is also possible to produce the same effect, when polytetrafluoroethylene is already dispersed in isopropyl alcohol in which boron nitride is already dispersed.

According to the present invention, since boron nitride, which is a chemically stable insulating material, is used as a matrix the corrosion resistance of the matrix against phosphoric acid and its strength to resist the differential pressure are improved. In addition, the thickness of its the matrix can be made thin by virtue of high insulation characteristics, and the output characteristics of the fuel cell can be improved because the electric conduction of the phosphoric acid fuel cell by electrons through the matrix is perfectly intercepted.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A matrix of a phosphoric acid fuel cell comprising:
   a sheet composed of a boron nitride powder bound with a fluorine-contained resin as a binder, the ratio of said powder being within the range from 85 to 95 percent by weight and the ratio of said resin being within the range from 5 to 15 percent by weight with respect to the total weight of said boron nitride powder and said resin.

2. A matrix as claimed in claim 1, wherein said resin is selected from the group consisting of polytetrafluoroethylene, tetrafluoroethylene/hexafluoropropylene copolymer, polyperfluoroalkoxyethylene, perpolyfluoroethylene propylene ether, tetrafluoroethylene/perfluoroalkylvinylether copolymer, trifluoroethylene and tetrafluoroethylene/ethylene copolymer.

3. A method for making a matrix of a phosphoric acid fuel cell comprising the steps of:

dispersing a boron nitride powder in a solvent to produce a first dispersion;

dispersing a fluorine-contained resin in another solvent to produce a second dispersion;

mixing said first dispersion with said second dispersion to produce a third dispersion;

separating a solid content from said third dispersion;

making said solid content into a form of sheet; and drying said sheet.

4. A method for making a matrix of a phosphoric acid fuel cell comprising the steps of:

dispersing a boron nitride powder in a solvent to produce a first dispersion;

dispersing a fluorinated-contained resin in the first dispersion to produce a second dispersion;

separating a solid content from said second dispersion;

making said solid content into a form of sheet; and drying said sheet.

5. A phosphoric acid fuel cell comprising:

a fuel electrode;

an air electrode; and a matrix for retaining phosphoric acid sandwiched between said electrodes, said matrix being composed of a boron nitride powder bound with a fluorine-contained resin as a binder.

6. A fuel cell as claimed in claim 5, wherein the ratio of said powder is within the range from 85 to 95 percent by weight and the ratio of said resin is within the range from 5 to 15 percent by weight with respect to the total weight of said boron nitride and said resin.

7. A fuel cell as claimed in claim 5, wherein said resin is selected from the group consisting of polytetrafluoroethylene, tetrafluoroethylene/hexafluoro propylene copolymer, polyperfluoroalkoxyethylene, perpolyfluoroethylene propylene ether, tetrafluoroethylene/perfluoroalkylvinylether copolymer, trifluoroethylene and tetrafluoroethylene/ethylene copolymer.

* * * * *